Figure 1:
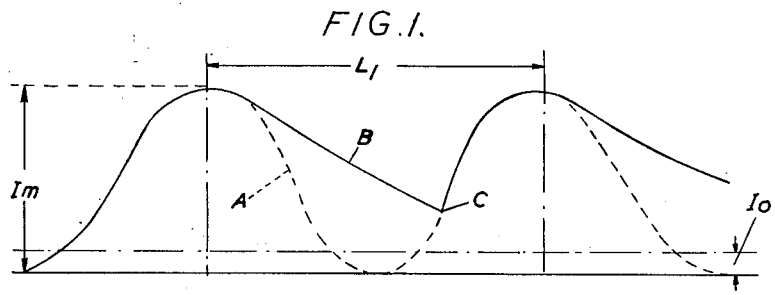

April 13, 1954     J. C. MILNE     2,675,491
ELECTRONIC ALTERNATOR SYNCHRONIZER
Filed March 23, 1953     2 Sheets-Sheet 1

Inventor
John Charles Milne
By Ralph B. Stewart
Attorney

April 13, 1954     J. C. MILNE     2,675,491
ELECTRONIC ALTERNATOR SYNCHRONIZER

Filed March 23, 1953     2 Sheets-Sheet 2

Inventor
John Charles Milne
By Ralph R. Stewart
Attorney

Patented Apr. 13, 1954

2,675,491

UNITED STATES PATENT OFFICE 2,675,491

ELECTRONIC ALTERNATOR SYNCHRONIZER

John Charles Milne, Wolverhampton, England, assignor to Electric Construction Company Limited, Wolverhampton, England Application March 23, 1953, Serial No. 344,065

2 Claims. (Cl. 307—87)

When an alternator is to be connected in parallel with an independent source of alternating current so as to supply a portion of the load, it is, of course, important that when the connection is made, the frequency of the alternator voltage should be substantially the same as that of the source, and also that the two voltages should be in phase so as to avoid heavy circulating currents. The simplest method of obtaining an indication of these conditions is by the use of a synchronising lamp supplied by the voltages derived respectively from the source and from the alternator and connected in opposition to one another. Assuming that the peak values of these two voltages are substantially equal, when the two are in phase they will cancel out and the lamp will not be illuminated. On the other hand, when the two voltages are in antiphase, the resultant voltage supplied to the lamp will be a maximum and the illumination will, therefore, be a maximum. If, therefore, the frequency of the alternator is slightly different from that of the source, the voltage supplied to the lamp will vary continuously from a maximum to a minimum and the lamp will vary in brilliance at a frequency corresponding to the difference of the two frequencies, or in other words, the beat frequency of the two sources.

If there is a considerable difference in frequency, the beat frequency will be large and the synchronising lamp will flicker rapidly. The operator must, therefore, control the speed of the alternator to bring down the beat frequency, and then when it has reached a small value, he must wait until the lamp is unilluminated, showing that the two sources are in phase with one another, when he may safely connect the alternator in parallel with the independent source. This common method of synchronisation, however, requires not only careful observation by the operator, but also involves manual operation of a circuit breaker to connect the alternator in parallel with the source when the correct conditions are obtained.

It has been proposed to construct alternator synchronisers employing one or more valves which operate to carry out the synchronisation under the correct conditions of voltage, phase and frequency. It is the object of the present invention to provide apparatus of this same general type, but of extremely simple nature, and comprising a very small number of parts, and which is furthermore self-resetting.

The system according to the invention, therefore, employs a single hard vacuum valve supplied from a direct current source, and voltages corresponding respectively to the voltage of the alternator and to that of the source and having substantially equal peak values are connected in opposition to one another, and the rectified resultant is applied to the ends of a resistance shunted by a condenser of substantially greater capacity than that required merely to smooth out the power frequency component of the voltage, this resistance or part of it being connected between the cathode and grid of the valve, in the anode circuit of which is a device arranged to connect the alternator in parallel with the source when the potential drop across the resistance drops to a value corresponding to a difference of frequency at which the alternator may be paralleled with safety.

Figure 2:
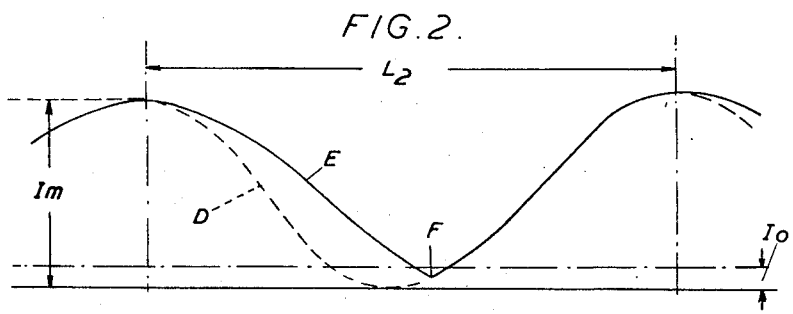
Figure 3:
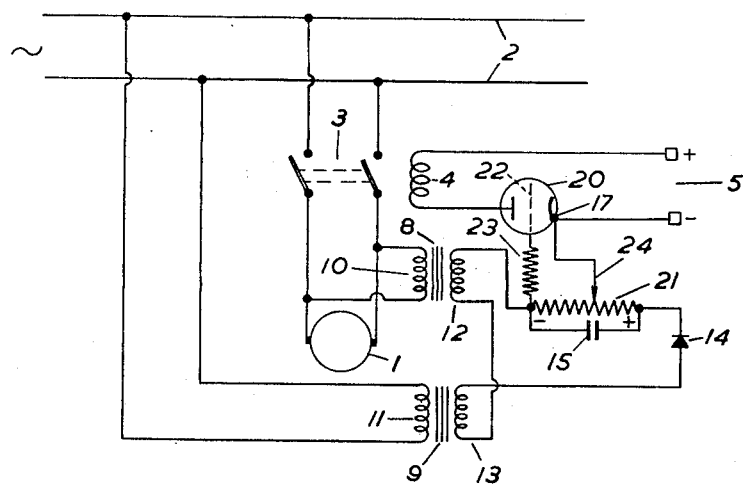

In order that the invention may be more fully explained, it will now be more fully described in connection with an example of a circuit arrangement and with reference to the accompanying drawings, in which:

Figures 1 and 2 are diagrams showing the wave form of current flowing in the resistance for two values of the difference of frequency; and Figure 3 is a circuit diagram of a form of the synchroniser according to the invention.

Referring first to Figure 1, the rectifier used to rectify the resultant current flowing through the resistance, which may conveniently be a half-wave rectifier, will allow current to flow only in one direction, and these alternate waves will vary from a maximum when the voltages are out of phase to a minimum when they are in phase, as already described. Normally, these current impulses have an approximately smooth wave form, indicated by the dotted curve shown at A in Figure 1. Thus the current through the resistance varies at the beat frequency between a maximum value equal to $Im$ and a minimum value equal to zero. In practice, however, due to the condenser connected in parallel with the resistance, which is of greater capacity than that required merely to smooth out the power frequency component of the voltage, instead of the current decaying to zero as in the curve A, current flows from the condenser and tends to slow down the rate of decay of current. This condition is represented by the full line wave B and it will be seen that this intersects the rising curve at C so that the current in the resistance is never allowed to drop to zero.

As will be seen from Figure 1, in which the period of the beat frequency is relatively short, in fact equal to twice $L1$, the current in the resistance never drops as low as the value $Io$, the importance of which will be described hereinafter.

In the condition shown in Figure 2, the period of the beat frequency, equal to twice $L2$, is appreciably greater and the beat frequency is correspondingly less. Without the condenser the wave form would follow the dotted curve D. Owing to the provision of the condenser, however, the full line curve E is followed, and it will be seen that the presence of the condenser produces a smaller rate of decay of the current in the resistance than that shown at B. By reason of the greater wave length, however, the trough representing the minimum current condition is wider, so that the curve E intersects the rising curve at F, which corresponds to a value of current slightly less than the predetermined value Io.

Now the potential drop across the resistance is always directly proportional to the current through it, and the whole or part of this potential drop is used to apply the grid bias to a hard vacuum valve which is supplied from a direct current source. As the current through the resistance decreases, the control grid of the valve becomes less negative, allowing greater anode current to pass from the direct current source. A relay, the coil of which may be in the anode circuit of the valve, may be used to close a switch to parallel the alternator and source or to close a switch energising a further relay which serves to parallel the alternator and source. The value of the resistance and characteristics of the valve are arranged to be such that the parallelling operation takes place only when the current through the resistance drops below the predetermined value Io. For currents greater than this the control grid of the valve is kept sufficiently negative with respect to the cathode to prevent sufficient anode current passing to operate the parallelling relay.

Referring to Figure 3, an alternator 1 is arranged to be connected to a separate source of alternating current represented by power lines 2, which may be connected to a second alternator or other source of supply. The alternator is connected to the mains by way of a double-pole circuit breaker 3 operated by a relay coil 4, which is supplied from a source of direct current 5 through hard vacuum valve 20.

Voltages corresponding respectively to the voltage of the alternator 1 and that of the source 2 are derived from transformers 8 and 9, the primary winding 10 of the transformer 8 being connected across the alternator terminals, and the primary winding 11 of the transformer 9 being connected directly across the mains supply 2. The secondary windings 12 and 13 are connected in opposition, and the circuit is completed by the half-wave rectifier 14 and by the resistance 21 shunted by condenser 15. The turns ratios of the two transformers 8 and 9 are equal, so that, when the voltage of the alternator 1 and the mains supply 2 are equal and in phase, the resultant voltage across the secondary windings 12 and 13 is zero.

The hard vacuum triode valve 20 is supplied from the direct current source 5 through the relay coil 4. The control grid 22 is connected to the negative end of resistance 21 by way of isolating resistance 23, and the cathode 17 is connected to an adjustable tapping 24 on the resistance 21. The adjustable tapping 24 is set at such a point that, when the current flowing through resistance 21 is greater than the predetermined value Io, the grid of the valve 20 is negative with respect to the cathode 17 to such an extent that anode current is kept below the value necessary to energise relay coil 4. When, however, the current through resistance 21 drops below the value Io, the anode current of valve 20 energises relay coil 4 from source 5, closing circuit breaker 3 to parallel the alternator 1 with the independent source 2.

The value of the beat frequency at which the alternator is automatically parallelled may be simply varied by adjustment of the tapping 24, which controls the negative potential applied to grid 22.

In a particular example of the circuit shown in Figure 4, the resistance 21 is one megohm, the condenser 15 has a capacity of 0.05 microfarad and the resistance 23 has a value of 500,000 ohms. With the tapping 24 set in its mid-point, the alternator is parallelled for a beat frequency corresponding to a period of four seconds, and adjustment over a range of periods up to twelve seconds can readily be achieved.

It will be understood that the operation of parallelling is entirely automatic. The only action required by the operator is slowly to adjust the speed and excitation of the alternator so as to bring its frequency and voltage towards those of the separate source. As soon as the frequencies and voltages are sufficiently closely equal to enable the alternator to be parallelled with safety, the circuit breaker 3 is automatically closed at the instant when the two voltages are in phase so that the degree of shock to the system is reduced to a small value and the alternator is then locked in synchronism with the separate source. Furthermore, if the voltages of the alternator and separate source are not sufficiently closely equal, even though they are of the same frequency and phase, the current through the resistance 21 will not drop to a sufficiently low value to parallel the two, and this further minimises the risk of shock to the system.

The synchronizer described herein forms an alternative to that described in my co-pending application Serial No. 344,066, filed March 23, 1953, in which is described a synchroniser containing no thermionic valves.

I claim:

1. Apparatus for automatically parallelling a source of alternating current with a second source of alternating current, when the difference in frequency between the said sources drops to a safe value, comprising in combination two transformers, a primary and a secondary winding on each of said transformers, said primary windings being connected each across one of said sources, and said secondary windings being connected together in series so that their output voltages are in opposition, a rectifier, a resistance, said rectifier and resistance being connected in series across said secondary windings, a condenser connected in parallel with said resistance, said condenser being of substantially greater capacity than that required merely to smooth out the power frequency component of the voltage appearing across said resistance, a hard vacuum thermionic tube having an anode, a cathode and a grid, a direct current source supplying said tube, a relay connected to the anode of said tube, said resistance being connected between said grid and cathode, whereby the anode current of said tube energises said relay to connect the said two sources in parallel only when the current in said resistance drops to a value corresponding to said safe value of the difference in frequency.

2. Apparatus according to claim 1, wherein the fraction of said resistance connected between said grid and cathode is adjustable.

No references cited.